July 26, 1966  R. MacROBBIE  3,262,724
CABLE CONNECTOR

Filed Aug. 2, 1963  2 Sheets-Sheet 1

INVENTOR
ROBERT MAC ROBBIE

July 26, 1966  R. MacROBBIE  3,262,724
CABLE CONNECTOR
Filed Aug. 2, 1963  2 Sheets-Sheet 2

INVENTOR
ROBERT MAC ROBBIE

United States Patent Office 3,262,724
Patented July 26, 1966

3,262,724
CABLE CONNECTOR
Robert MacRobbie, Brooklyn, N.Y., assignor to Richmond Screw Anchor Co., Inc., Brooklyn, N.Y.
Filed Aug. 2, 1963, Ser. No. 299,608
2 Claims. (Cl. 287—83)

This invention relates to cable connectors and to associated methods and structures.

Although various arrangements are known by means of which physical connections can be made between cables, wire, ropes and so forth, on the one hand, and anchoring devices and the like, on the other hand, no suitable technique is available for making connections to stress-free stranded cable or like cables which have been work hardened.

The invention accordingly purports to achieve, as one of its principal objects, the provision of an improved technique and structure especially adapted for making connections with cable and cable-like members of unusual hardness, it being understood that the methods and structures of the invention are also suitable for use with more conventional components.

In achieving the above and other of its objectives, the invention contemplates a method involving the use of a sleeve provided with a bore preferably extending only partially therethrough. In association with this sleeve there may be employed at least one, and preferably more, metal inserts in the form of tubes, the diameter of which would enable a press fit in the aforesaid bore.

According to a feature of the invention, the interior surfaces of the tubes are threaded, serrated or otherwise treated to form teeth therein.

According to a further feature of the invention, the tubes are each provided with diametrally opposed axial slots which divide the tubes each into a base ring having axially extending legs thereon, as will hereinafter be shown in greater detail.

It is preferred that these tubes be hardened so that the material thereof is harder than that of the above-noted sleeve. It has been discovered that upon such hardening the legs of each tube flare outwardly and consequently exceed the diameter of the bore in the above-noted sleeve so that the tubes may be rigorously positioned in said bore in axially abutting relationship.

According to still another feature of the invention there is employed a moisture lock or seal element in the form of a plastic retainer ring having thereon a protrusion which functions as a gauge to determine the depth to which the above-noted inserts are urged into the bore in the sleeve.

In accordance with a very important aspect of the invention the sleeve is deformed, such as by swaging, around the tubes and a cable inserted into the tubes so that the above noted legs are forced together in the gripping relationship with the cable and such that the tubes assume a wedge shape to which the sleeve is intimately conformed.

Advantageously, the above noted technique is admirably suited for use with stress-free or pre-stressed cables which are of unusually high Rockwell hardness due to the working to which such cable is subjected.

A further feature of the invention involves the provision of an external thread upon the above noted sleeve.

The article of manufacture resulting from the above noted technique may be employed in various construction procedures. For example, it is a further object of the invention to provide an improved hanger arrangement empolying cables having connectors thereon of the improved type.

Still a further object of the invention is to provide improved form ties employing thusly processed cables.

The above and further objects, features and advantages of the invention will be apparent from the following detailed description of some preferred embodiments as illustrated in the accompanying drawing in which.

Figure 8:
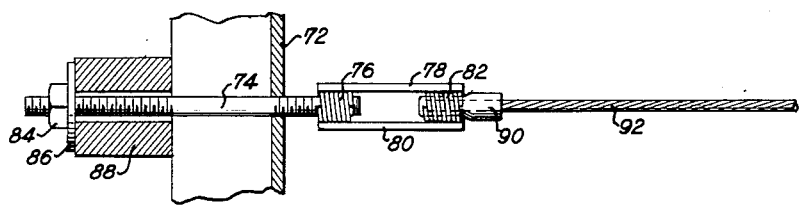
Figure 9:
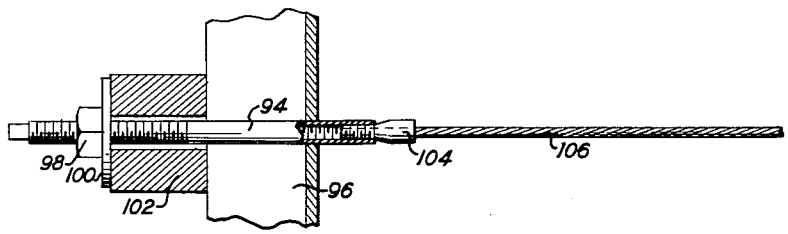

FIGURE 8 diagrammatically illustrates a type of form tie employing a connection of the invention; and FIGURE 9 diagrammatically illustrates a second type of form tie using a connector of the invention.

Figure 1:
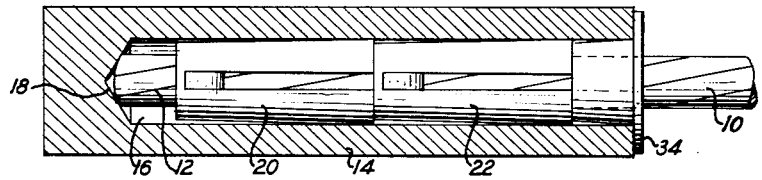
FIGURE 1 is a partially sectional view of components assembled on the end of a cable preparatory to forming a connector on the latter.

In FIG. 1 is illustrated generally a 7-strand cable 10 of intertwined strands and preferably of the stress-free or pre-stressed type such that its Rockwell hardness has been substantially increased due to the processing which said cable has been subjected to. The Rockwell hardness of this cable may, for example, run to an index of 60 although as will become apparent hereinafter, the invention is also suitably applicable to softer materials as well as harder materials.

Mounted on the end 12 of cable 10 is a cylindrical sleeve 14 provided with an axial bore 16 conveniently terminated in a conical end portion 18.

Figure 3:
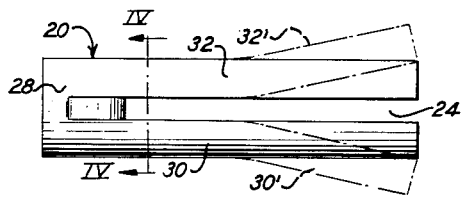
FIGURE 3 is a side view of an insert employed in the structure of FIGS. 1 and 2, a deforming which occurs during processing being shown in phantom lines.
Figure 4:
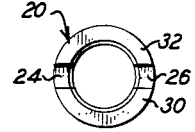
FIGURE 4 is a sectional view taken along line IV—IV of FIG. 3.

Accommodated within the bore 16 are two inserts 20 and 22, insert 20 of which is shown in greater detail in FIGS. 3 and 4 by way of example.

In the latter said figures it appears that each insert is provided with a pair of diametrally opposed axial slots 24 and 26 which effectively divide each insert into a base ring 28 and two opposed axially extending legs 30 and 32.

The sleeve 14 is preferably fabricated of a carbon steel. The inserts 20 and 22 are preferably fabricated of a cold rolled steel which is fully pack hardened. A hardening of inserts 20 and 22 is effected following the forming of slots 24 and 26 therein. Legs 30 and 32, it has been found, tend to flare outwardly and assume the position indicated at 30' and 32'.

The bore 16 is of a predetermined diameter. The outer diameter of ring 28 is preferably such as to permit a press fit of the ring into said bore. The expanding outwardly of legs 30 and 32 results in that the inserts need be positively forced into said bore so that a very precise fitting of the same in said bore and maintaining of the inserts in position is possible. This, however, is not the primary use of the aforesaid axial slots as will hereinafter become apparent.

The inserts 20 and 22 are forced into bore 16 to a determinable depth by the use of a retainer ring 34 which performs a plurality of functions.

Figure 6:
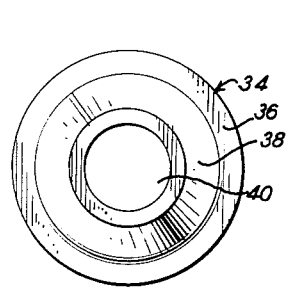
FIGURE 6 is an end view of said retainer ring.
Figure 5:
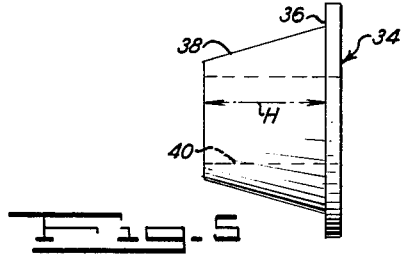
FIGURE 5 is a side view of a retainer ring employed in the structure of FIGS. 1 and 2.

As shown in FIGS. 5 and 6, retainer ring 34 comprises a flat annular flange 36 atop of which is provided a frustoconical protrusion 38 through which extends a center hole 40. Protrusion 38 is of a height H which determines the extent to which the inserts are forced into bore 16 in view of the axially abutting relationship into which retainer ring 34 is forced in relation to the outermost of said inserts.

In addition, and as will be shown, retainer ring 34 is caused to assume a hermetically sealed relationship with the cable 10 and with the sleeve 14 so that the retainer ring operates as a moisture seal or lock preventing moisture from penetrating into the interior of bore 16. Further, the retainer ring 34 is preferably fabricated of a plastic such as polyethylene and in practice is suitably color coded for purposes of identifying the structure into which it is incorporated.

Figure 2:
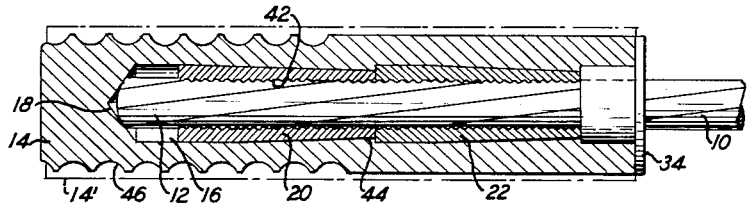
FIGURE 2 is a corresponding view illustrating the connector after forming operations have been performed thereon.

With inserts 20 and 22 coaxially aligned and inserted in bore 16 in concentric relationship with sleeve 14 and with retainer ring 34 suitably plugged into the outer extremity of said bore, the arrangement of FIG. 1 is ready for being finished in the form indicated in FIG. 2. This is accomplished by deforming sleeve 14 from its original shape shown in phantom lines at 14' in FIG. 2 to the shape shown in solid lines. This operation is preferably effected by swaging or by any other conventional cold forging operation.

The ring 28 (see FIG. 3), being harder than the cable 10 and the material from which sleeve 14 is formed, effectively maintains its original shape and dimension. Due to slots 24 and 26 (FIG. 4) legs 30 and 32 of inserts 20 and 22 are compressed towards one another so that each insert assumes a tapered or wedge shape.

Moreover, each of the inserts or tubes 20 and 22 is provided with internal teeth 42 by means of having been provided with an internal thread or being otherwise serrated. These teeth, which are harder than the material of cable 10, are forced into the latter therefore providing an extremely effective grip.

In addition, the material of sleeve 14 is caused by the deforming operation to conform intimately to the shape assumed by the inserts. The portions particularly indicated by way of example at 44 form an annular step which absolutely insures against relative displacement between the inserts and sleeve. Effectively therefore a monolithic structure is provided involving as essential components thereof the cable, said inserts and said sleeve.

The retainer ring 34 is at the same time deformed to form the aforementioned hermetic seal. Its plastic material is, as a result of the deformation of sleeve 14, brought into close engagement with cable 10 and said sleeve.

Sleeve 14 now has a greatly reduced diameter as is apparent from a comparison of the solid and phantom lines in FIG. 2 and is ready for the provision of means through which engagement can be made with cable 10. Said means takes the form in FIG. 2 of an exterior thread 46 which may be provided on the sleeve for approximately half its length by methods and techniques which are conventional per se.

Figure 7:
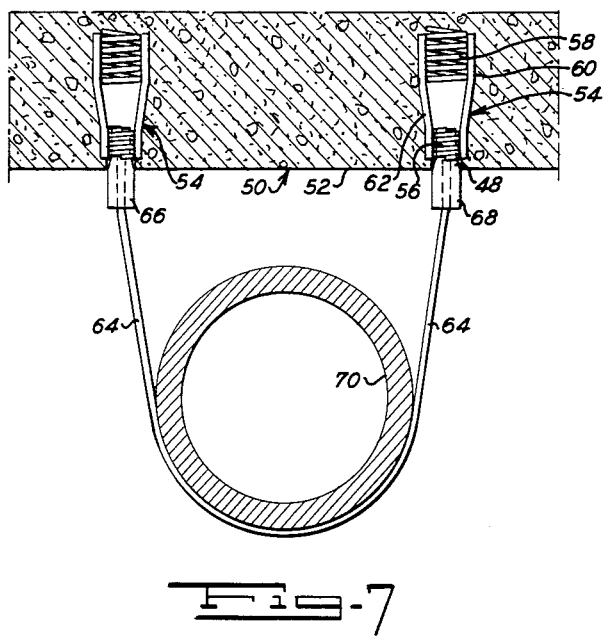
FIGURE 7 is a diagrammatical illustration of a hanger employing a cable having connectors thereon slightly modified from the connector illustrated in FIGS. 1 and 2.

A hanger devised from a cable provided with connectors of the invention appears in FIG. 7 wherein a slight modification of said connectors is illustrated due to the inclusion of a taper 48.

According to FIG. 7, there is provided an anchor base 50 of concrete or the like, having a bottom horizontal surface 52 in which appears two threaded receptacles 54 spaced apart a suitable distance.

Said receptacles consist of a coil 56 constituting a thread and a coil 58 connected by wire struts 60 and 62 welded thereto.

A U-shaped loop 64 of pre-stressed cable is provided at the extremities thereof with connectors 66 and 68 threaded as noted above, the threaded portions being accommodated in the receptacles 54. A pipe or conduit 70 or the like may be thusly suspended along with loop 64 from anchor base 50.

A vertical support 72 is illustrated in FIG. 8, a bolt 74 extending horizontally therethrough and threadably engaging a coil 76 connected by struts 78 and 80 to thread coil 82. Bolt 74 is held by a nut 84 and washer 86 in position in cooperation with a spacer 88.

A threaded connector 90 affixed at the end of cable 92 threadably engages in thread coil 82 and connects cable 92 rigidly to vertical support 72. Cable 92 may be readily placed under tension by adjustment of nut 84.

A variation of FIG. 8 is illustrated in FIG. 9 wherein a horizontal sleeve 94 passes through vertical support 96 and is held in position by a nut 98 cooperating with washer 100 and a spacer 102. Sleeve 94 is provided with an interior thread engaging threaded connector 104 mounted on a cable 106. Cable 106 may be placed under suitable tension by adjustment of nut 98.

There will now be obvious to those skilled in the art many modifications and variations of the structures and methods set forth above. These modifications and variations will not, however, depart from the scope of the invention if defined by the following claims.

What is claimed is:

1. An article of manufacture comprising a stress-free cable of intertwined strands; and on at least one end of said cable, a connector assembly comprising a sleeve provided with a blind bore, first and second generally cylindrical inserts of a material harder than that of said sleeve and cable, said inserts being provided with passages extending axially therethrough and with diametrally opposed axial slots dividing each insert into a base ring with two legs extending axially therefrom, said inserts being coaxially aligned one behind the other within said bore with the ring of one sleeve abutting against the legs of the other sleeve, said inserts including internal teeth lining said passages, said cable extending through said passages within said bore, said sleeve crushing the legs of said inserts and thereby said teeth against said cable and causing the inserts to assume tapered wedge-like shape, and wherein a step is established between the inserts, said sleeve by virtue of its relative softness as compared to the inserts being internally deformed at said bore to intimately engage the tapered inserts, and a retainer ring encircling the said cable and extending into the bore of said sleeve into axially abutting relation with one of said inserts, and means on said sleeve whereby said cable is adapted for having a connection made therewith.

2. An article of manufacture as claimed in claim 1 wherein said retainer ring is constituted of plastic material and includes a flat annular flange portion and a frusto-conical protrusion, the latter protrusion having an end of small diameter which is in axial abutment with said one insert.

References Cited by the Examiner

UNITED STATES PATENTS

| | | | |
|---|---|---|---|
| 1,220,326 | 3/1919 | Fargo | 287—126 |
| 1,643,110 | 9/1927 | Briggs | 29—517 X |
| 1,750,790 | 3/1930 | Bessonett | 285—342 |
| 2,272,244 | 2/1942 | Klein | 29—517 |
| 2,427,176 | 9/1947 | Aldeen | 29—517 |
| 2,546,312 | 3/1951 | Larymore | 287—126 |
| 2,686,359 | 8/1954 | Spencer | 29—517 |
| 2,701,149 | 2/1955 | Kreidel et al. | 285—382.7 X |
| 2,832,118 | 4/1958 | Lehmann | 29—517 |
| 2,930,642 | 3/1960 | Howlett | 287—114 |
| 3,033,600 | 5/1962 | Drysdale | 287—114 |

FOREIGN PATENTS 691,215    5/1953   Great Britain.

CARL W. TOMLIN, *Primary Examiner.*

I. B. TALTON, D. W. AROLA, *Assistant Examiners.*